United States Patent Office 3,044,390
Patented July 17, 1962

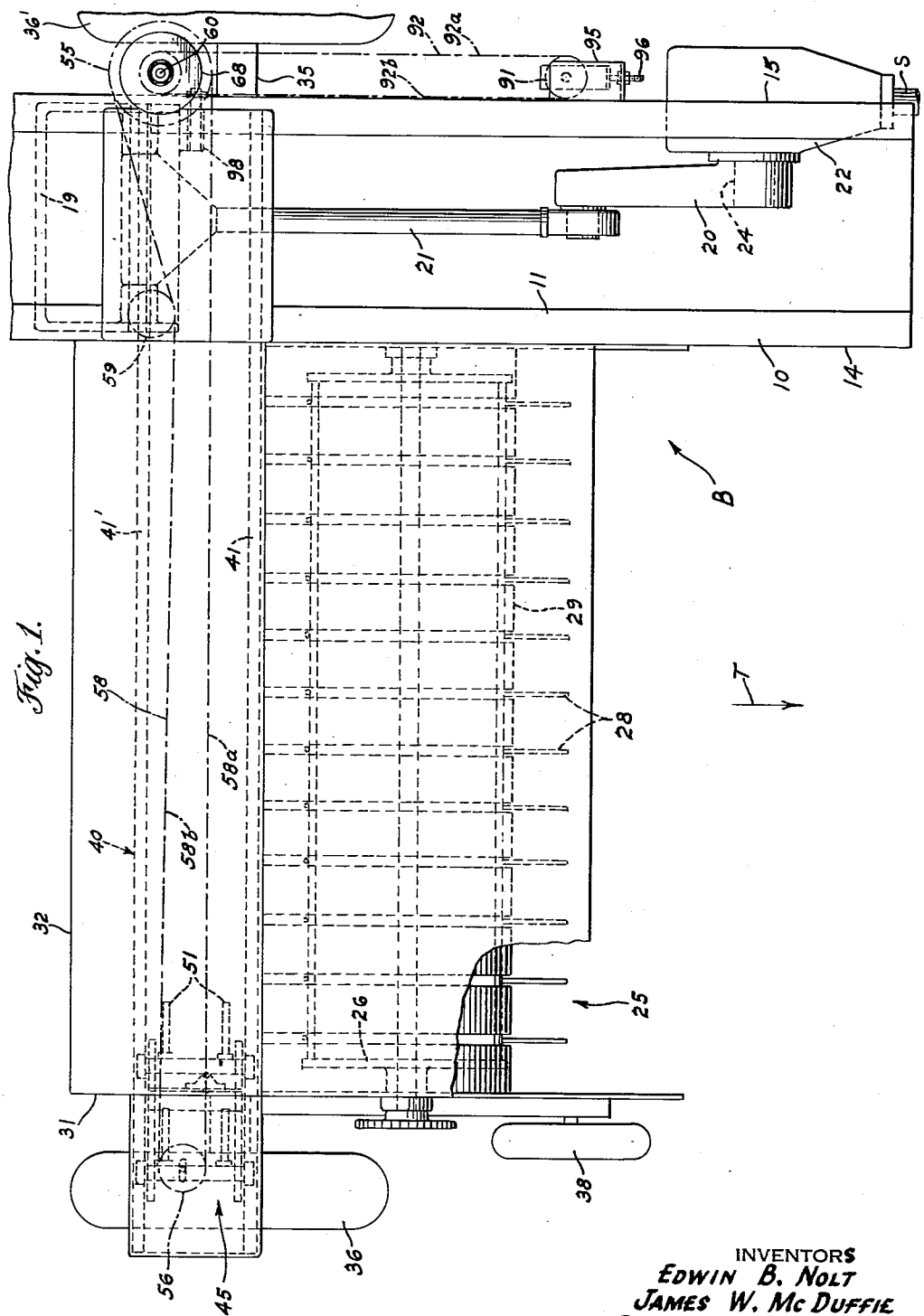

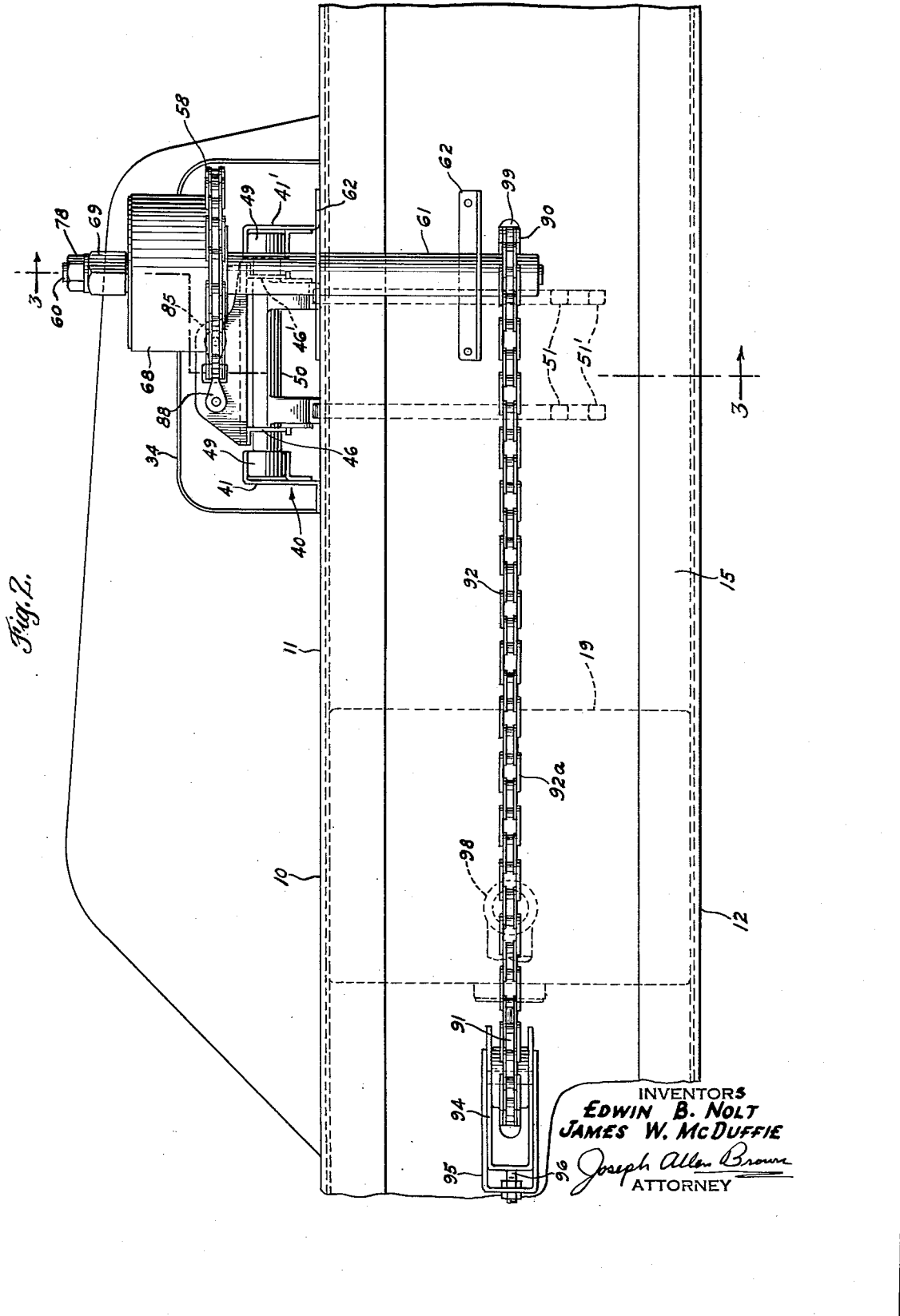

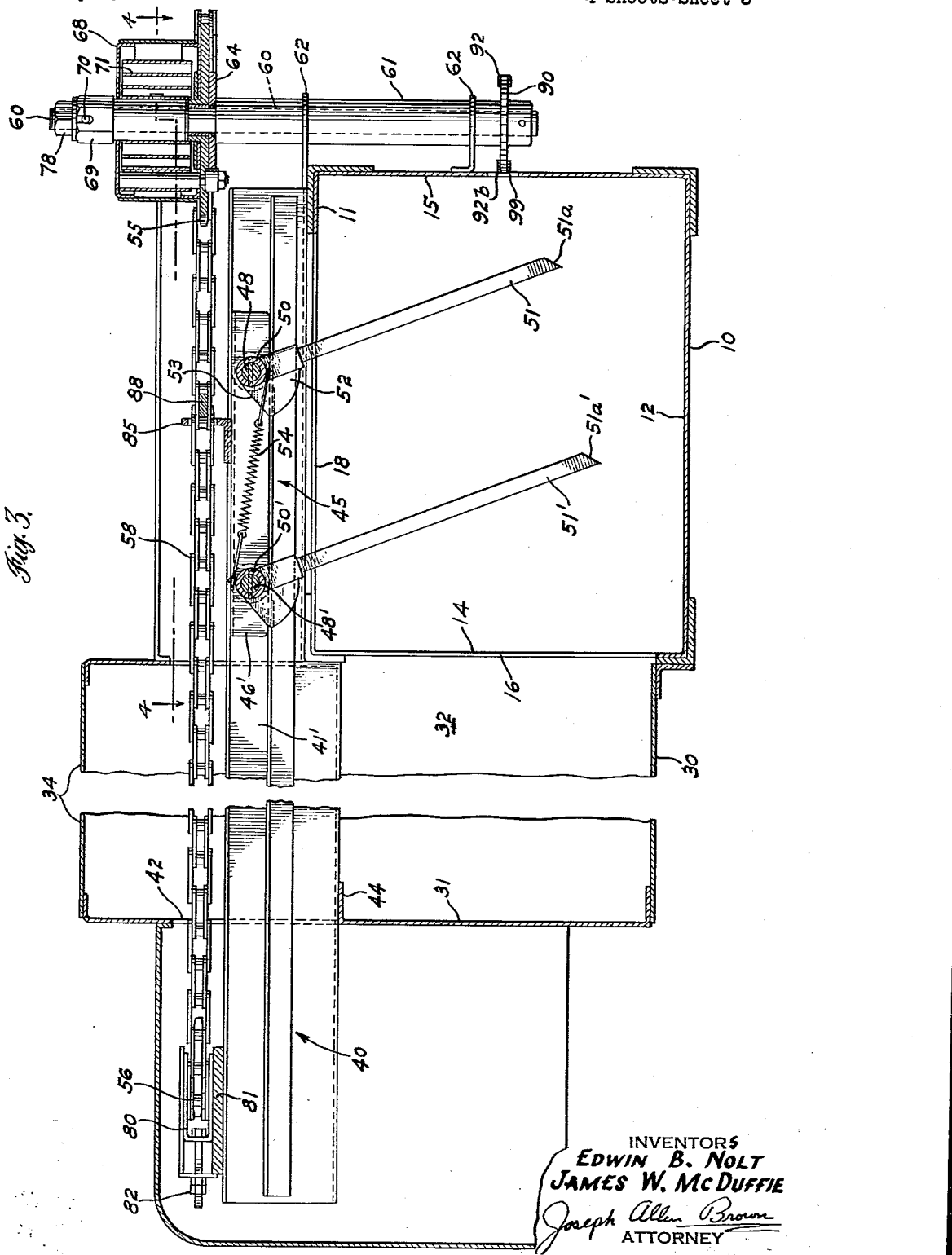

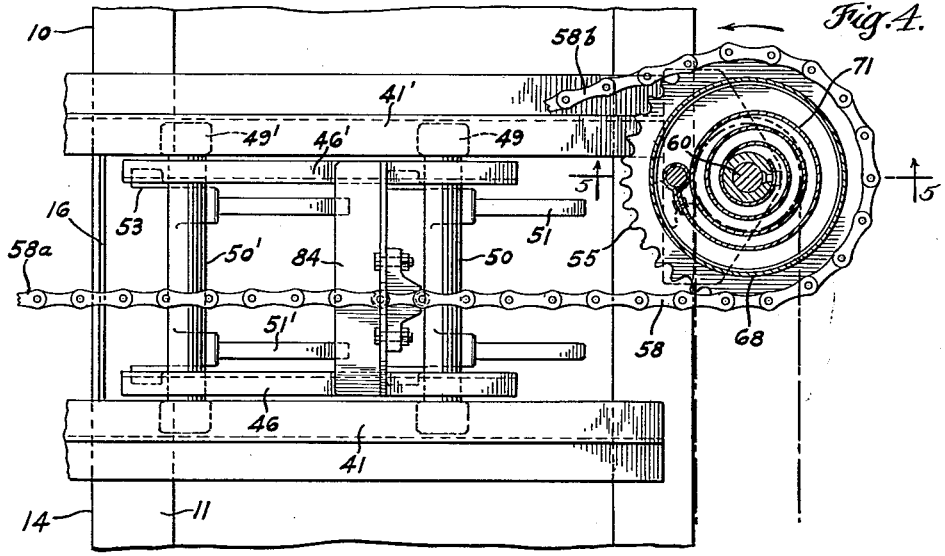
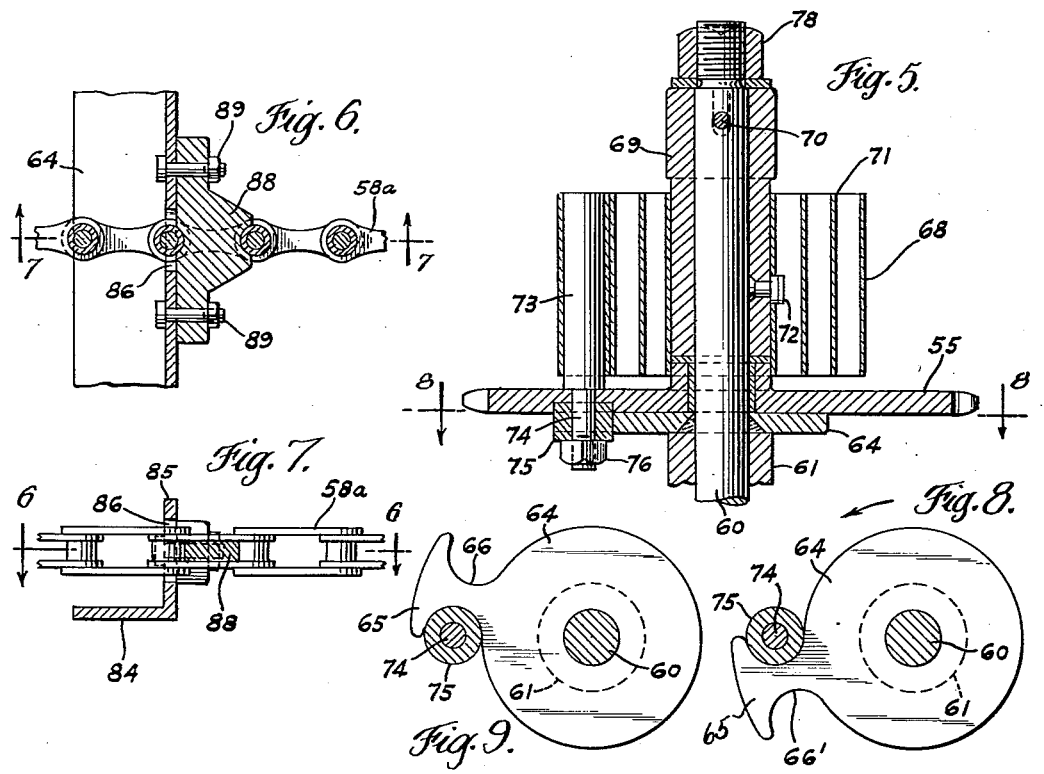

3,044,390
HAY BALER
James W. McDuffie and Edwin B. Nolt, New Holland, Pa., assignors to Sperry Rand Corporation, New Holland, Pa., a corporation of Delaware
Filed May 9, 1958, Ser. No. 734,333
5 Claims. (Cl. 100—142)

This invention relates to automatic hay balers of the type in which hay is fed into a bale chamber through an opening in a side thereof by means entering the bale chamber in timed relation with a plunger reciprocable therein and past the chamber opening. More particularly, the invention relates to an improved feed mechanism for such a baler.

One object of this invention is to provide a feed mechanism which is of relatively simple design, and capable of being manufactured, assembled and/or disassembled at low cost.

Another object of this invention is to provide an improved feed mechanism which, while being of low cost, will operate in a highly efficient manner.

Another object of this invention is to provide a feed mechanism which, because of its simple, practical design, is easy to repair thereby fulfilling a requirement of manufacturer and user alike.

Another object of this invention is to provide a feed mechanism of the character descirbed in which power is applied to the feed mechanism through a simplified drive means.

A further object of this invention is to provide a feeding mechanism of the character described which when operating on a feeding stroke will respond to prevailing feeding conditions and provide a controlled feeding of material into a bale chamber.

A still further object of this invention is to provide a feed mechanism of the character described which operates impositively on each working stroke and positively on each return stroke.

Other objects of this invention will be apparent hereinafter from the specification and from the recital in the appended claims.

In the drawings:

FIG. 1 is a fragmentary plan view of a hay baler having a feed mechanism constructed according to this invention, the baler plunger being shown extended and the feed mechanism retracted;

FIG. 2 is an enlarged side elevation looking from right to left in FIG. 1 but showing the baler plunger retracted and the feed mechanism extended;

FIG. 3 is a fragmentary section taken on the lines 3—3 of FIG. 2 and looking in the direction of the arrows;

FIG. 4 is a fragmentary section taken on the line 4—4 of FIG. 3 and looking in the direction of the arrows;

FIG. 5 is an enlarged vertical section taken on the line 5—5 of FIG. 4 and looking in the direction of the arrows;

FIG. 6 is a section taken on the line 6—6 of FIG. 7, looking in the direction of the arrows, and showing in detail a portion of the feed mechanism;

FIG. 7 is a section taken on the line 7—7 of FIG. 6 looking in the direction of the arrows;

FIG. 8 is a section taken on the line 8—8 of FIG. 5 looking in the direction of the arrows and showing the parts in one operative position; and FIG. 9 is a view similar to FIG. 8 but showing the parts in another operative position.

Referring now to the drawings by numerals of reference, and particularly to FIGS. 1-3, B denotes a baler having a bale chamber 10 which is rectangular in cross section (FIG. 3). Bale chamber 10 extends in a fore-and-aft direction relative to the travel of the baler, indicated by the arrow T in FIG. 1, and is disposed in horizontal relationship to the ground. The chamber has a top wall 11, a bottom wall 12 and opposed side walls 14 and 15. Side wall 14 has an opening 16 through which crop material may be fed into the bale chamber. Top wall 11 has an opening 18 communicating with opening 16.

Reciprocable fore-and-aft in bale chamber 10 is a plunger 19 reciprocated by a rotatable crank arm 20 connected to the plunger through connecting rod 21. Crank arm 20 receives power from a power input shaft S which may be driven from the tractor which tows the baler or from an engine carried directly on the baler. Shaft S leads into a gear box 22 having an output shaft 24 on which the crank arm is carried. In its reciprocable movements, plunger 19 moves rearwardly on a working stroke, past the openings 16 and 18 in the side wall 14 and top wall 11, respectively, and then retracts forwardly. Hay delivered to the bale chamber is compressed by the plunger into bales which move progressively rearwardly as they are formed. After each bale is completed it is banded by a tying mechanism, not shown, and subsequently discharged rearwardly and onto the ground or onto a trailing wagon.

Extending alongside bale chamber wall 14 and forwardly of the opening 16 is a transverse, rotatable pickup mechanism 25 comprising a reel 26 having angularly spaced rows of radially projecting pickup fingers 28. The fingers in each row are laterally spaced and separated by stripper plates 29. Cut crop material resting on the ground in a windrow is adapted to be engaged by the tines 28 and elevated, the material passing over the stripper plates 29 and being deposited rearwardly onto a hay receiving platform 30, FIG. 3. The details of the structure of the pickup may be similar to that shown in U.S. Patent No. 2,757,602 issued August 7, 1956.

Platform 30 extends laterally from a point adjacent the lower edge of opening 16 in the side wall 14. The platform is opened forwardly. It is shrouded by a housing comprising a side wall 31, a rear wall 32 and top wall 34.

Bale chamber 10, pickup 25 and hay platform 30 are carried on a frame including a transverse axle 35 (FIG. 1) having ground wheels 36 and 36' at its respective ends. The pickup 25 also includes a ground or guide wheel 38. As is conventional, the pickup floats responsive to ground variations as determined by engagement of wheel 38 with the ground.

All of the structure thus far set forth is conventional and is recited to provide the environment of applicants' improvement which resides in the feeding mechanism which will now be described.

Mounted above bale chamber 10 and platform 30 is a horizontal track 40 comprising spaced parallel rails 41 and 41' (FIGS. 1 and 2). One end of each rail is supported on the top wall 11 of the bale case 10. The opposite ends of the rails extend through an opening 42 (FIG. 3) in wall 31 and are supported on an inturned flange 44 of the wall.

Movable over track 40 is a carriage 45 comprising a pair of spaced angle members 46 and 46' (FIG. 4) which extend parallel to the rails of the track. Members 46—46' are connected by a pair of pivot shafts 48—48' (FIG. 3) the ends of which project beyond angle members 46—46' and have rollers 49—49' connected to them. The rollers are engageable with and rollable on the guide track rails. Tubular members 50—50' are pivotal on the shaft 48—48', respectively. Connected to the tubular members and projecting downwardly therefrom are pairs of feed fingers namely, front fingers 51 and rear fingers 51'. Each finger is cut off at an angle at its lower end, as shown at 51a and 51a'. The front set of fingers is shorter than the rear set. Each tubular member 50—50' has a radially projecting plate 52 at each end having a flange surface 53 engageable with the adjacent angle member to limit pivoting of the feed fingers in one direction, that is clockwise from the position shown in FIG. 3. The feed fingers 51—51' normally assume a position as shown in FIG. 3, that is, slightly inclined relative to vertical. The front pair of fingers 51 are connected to the rear set of fingers 51' by a spring 54. The connection of the spring is such that if the front set of fingers rotates counterclockwise such will tend to rotate the rear set of fingers clockwise. Since the rear set of fingers 51' can rotate clockwise only until stopped by flanges 53, spring 54 will become extended upon counterclockwise pivoting of the front fingers beyond a given point and such pivoting will be resisted.

Mounted above carriage 45 and disposed at one end of track 40 is a drive sprocket or wheel 55. At the opposite end of the track is an idler sprocket or wheel 56. Sprockets 55 and 56 are rotatable on vertical axes. Extending around the sprockets is an endless member in the form of a feed chain 58 which operates in a horizontal plane and parallel to track 40. When viewed in plan as shown in FIG. 1, chain 58 has a forward reach 58a and a rearward reach 58b. An adjustable wheel 59 is provided for controlling the tightness of the chain.

Sprocket 55 is mounted on and driven by a shaft 60 as shown in FIGS. 4 and 5. Shaft 60 is rotatably supported by a vertically extending sleeve 61 carried on brackets 62 (FIGS. 2 and 3) projecting outwardly from the side wall 15 of bale chamber 10. The shaft extends above the upper end of sleeve 61. Welded to the shaft and seated on sleeve 61 is a control plate 64 which is generally in the form of a washer except for a radially projecting portion 65 (FIGS. 8 and 9) providing oppositely facing hooks or pockets 66—66'. Sprocket 55 seats on plate 64 and the parts are relatively rotatable. Sprocket 55 is connected to shaft 61 through a motor, spiral or clock spring 68 comprising a collar 69 connected to shaft 60 by a pin 70. Wound around collar 69 is a spring member 71, one end of which is connected to the collar by a fastener 72 and the other end of which is connected to a vertically extending link pin 73. Link pin 73 has a neck 74 of reduced diameter which extends through sprocket 55 and has a member 75 mounted on it. Member 75 is held in place by a nut 76; it normally seats in pocket 66 and is engageable with portion 65 of plate 64. The motor spring is retained in place by a nut 78 threaded onto the upper end of shaft 60. When shaft 60 is rotated counterclockwise (FIG. 4) it drives sprocket 55 impositively through spring 71. When shaft 61 is rotated clockwise, the sprocket is driven positively through plate 64.

Idler sprocket 56 is carried on a bracket 80 (FIG. 3) slidably adjustable relative to a fixed support 81 by means of nut-bolt 82. Sprocket 56 on adjustment is movable toward or away from sprocket 55.

Carriage 45 is connected to the forward reach 58a of feed chain 58. Such connection is shown best in FIGS. 4, 6 and 7. Extending between carriage members 46—46' is an angle member 84 having an upright leg 85 having a hole 86 through which reach 58a extends. Chain 58 is connected to member 84 by means of a block 88 which projects between two chain links and is fastened to leg 85 by shear bolts 89.

Chain 58 is adapted to be oscillated by drive sprocket 55. Oscillatory movement is imparted to drive sprocket 55 through a connection with the plunger 19. Referring to FIG. 2 it is seen that the lower end of shaft 61 has a sprocket 90 connected to it. The hub of sprocket 90 projects through a suitable gap in sleeve 61. Extending around sprocket 90 and a sprocket 91 mounted on side wall 15 of bale chamber 10 forwardly of shaft 60 is an endless chain 92. Sprocket 91 is carried on a bracket 94 adjustably carried on a bracket 95 welded or otherwise affixed to the bale case. The sprocket 91 is adjustable toward and away from the sprocket 90 by threadable adjustment member 96. Chain 92 has an outer reach 92a (FIG. 1) and an inner reach 92b. A connecting member 98 is provided between the plunger 19 and reach 92b whereby when the plunger is reciprocated the chain 92 is oscillated. Member 98 projects through a slot 99 in side wall 15. The oscillation of chain 92 operates through the shaft 60 to oscillate the sprocket 55. Sprocket 55 in turn oscillates the chain 58.

*Operation*

When the baler is moved across a field of cut and windrowed hay, the pickup 25 engages the material, elevates it and delivers it rearwardly to the feed platform 30. During the operation of the baler, plunger 19 reciprocates constantly moving rearwardly and past opening 16 in the bale chamber on a working stroke and then forwardly on a return stroke. Because of the connection 98 between the plunger and the inner reach 92b of chain 92, chain 92 is oscillated. Through sprocket 90 and shaft 60, drive sprocket 55 is oscillated. Sprocket 55 causes feed chain 58 to oscillate. Chain 58 in turn reciprocates carriage 45, the carriage rolling over track 40 between the sprockets 55 and 56 from the position shown in FIG. 1 to the position shown in FIG. 3 and then return.

As carriage 45 moves toward bale chamber 10 the feed fingers engage the crop material and sweep across the full length of platform 30, through opening 16 and into the bale chamber. When the fingers engage the hay on a feeding stroke they tend to pivot about shafts 48—48', or clockwise from the position shown in FIG. 3. However, the flanges 53 on plates 52 engage members 46—46' and limit the clockwise pivoting. When feeding hay, fingers 51—51' extend generally perpendicular to feed platform 30.

The feed fingers 51—51' enter bale chamber 10 through opening 16 in side wall 14. They hang down through the opening 18 in top wall 11 (FIG. 3). The feed fingers enter the bale chamber between working strokes of plunger 19. Since the feed mechanism is driven off the plunger, a definite time relationship is provided to preclude interference between the plunger and feed fingers.

On a return stroke, fingers 51—51' first assume the position shown in FIG. 3. If there is material on platform 30 as the fingers are retracted, which is usually the case, the fingers will pivot in a counterclockwise direction and slide over the hay. When they reach the fully retracted position of FIG. 1, the fingers will rest on the hay and extend on an incline toward bale chamber 10. When a feeding stroke commences, the ends 51a and 51a' will dig into the hay causing the feed fingers to swing downwardly to feeding position.

Thus, it is seen the feed fingers extend in a normal position, as shown in FIG. 3, on each feeding stroke, i.e., slightly inclined relative to vertical, but lay back on each return when there is hay on platform 30.

The spring 54 on carriage 45 has utility at the end of a feeding stroke. At the end of a feeding stroke, the feed fingers, particularly front set 51, tend to pivot counterclockwise when they come to an abrupt stop. If the front fingers were completely free to pivot in a counterclockwise direction they would tend to swing and hit the side wall 15 of the bale case. However, such swinging is resiliently resisted by spring 54. As shown in FIG. 3, spring 54 is connected to the bottom of tubular member 50 and the top of tubular member 50'. Therefore, pivoting of member 50 counterclockwise tends to pivot member 50' clockwise. Since fingers 51' may pivot clockwise only a limited amount, counterclockwise pivoting of fingers 51 will be against spring 54.

Moreover, on a return stroke when the feed fingers lay back, spring 54 is extended somewhat. Such energy assists in pivoting the fingers back to feeding position on a working stroke.

Ordinarily, the motor spring 68 plays no part in the feed and return strokes of carriage 45. However, when an overload condition occurs on a feeding stroke, such as an excessive accumulation of hay, a feed resisting force will be transmitted from fingers 51—51' to carriage 45, to chain 58, to sprocket 55 and from the sprocket to the motor spring. When rotated counterclockwise by shaft 60, as shown in FIG. 4, sprocket 55 tends to move reach 58a of chain 58 toward the bale case and the rotating force from shaft 60 to the drive sprocket is through pin 70, collar 69, fastener 72, spring member 71 and link pin 73. When an overload occurs producing a resisting force sufficient to overcome spring member 71, sprocket 55 will stop and shaft 60 will rotate relative to it, the spring member 71 winding up about collar 69. With the wind up of the spring member, plate 64 will rotate with shaft 60, to which it is affixed, moving from the position shown in FIG. 8 to the position shown in FIG. 9. Ordinarily, shaft 60 will reverse and turn in a clockwise direction before spring 71 is fully wound up, whereupon spring 71 will unwind, plate 64 will return to the position shown in FIG. 8, engage member 75 and positively drive sprocket 55 to move carriage 45 from the position shown in FIG. 3 back to the position shown in FIG. 1. Since sprocket 55 is coplanar with the chain 58 and spring 68 is coaxial with the sprocket, the forces developed when the spring winds up are operative in a plane substantially parallel and common to the plane of the chain.

Should plate 64 move from the position shown in FIG. 8 to the position shown in FIG. 9 and the spring member 71 become fully wound before sprocket 55 has completed the counterclockwise (FIG. 4) phase of an oscillatory stroke, carriage 45 will again move forward because the drive becomes solid. If the resistance to feeding becomes too great the shear bolts 89 will break to stop the feed. However, this is a rare occurrence.

While the breaking of the shear bolts 89 will stop carriage 45 on a feeding stroke, the carriage will be positively retracted when chain 58 is reversed for chain 58 may move in one direction through the opening 86 in leg 85 of bracket 84. However, when moving in the opposite direction block 88 on the chain will engage leg 85 and force the carriage 45 back toward starting position.

While applicant's structure is of simple design, it operates in a highly efficient manner, having desirable operating characteristics not found in other prior feeding mechanisms of much more complex structure. The mechanism of this invention provides a feeding action responsive to feeding conditions, and in that sense impositive. At the same time it provides a positive retraction after each working stroke.

In applicants' structure a low cost drive is provided between the plunger and the feeding mechanism. While a clock spring is shown interposed between the drive shaft 60 and the drive sprocket 55, other resilient means might be employed. For example, resilient means could be incorporated between the connection of the plunger and to the chain 92 to permit the necessary yielding.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay baler comprising a generally horizontally extending bale chamber having a feed opening in a side wall thereof, a plunger reciprocable in said bale chamber and past said opening, a platform extending laterally from said one side wall and feed opening, and means operable rectilinearly above said platform and in a generally horizontal plane for conveying hay across the platform, through said opening and into said bale chamber, said conveying means comprising a track extending transverse relative to said bale chamber and having one end mounted upon and extending over the top of the bale chamber and an opposite end supported remote from the bale chamber, a carriage mounted on said track, means for reciprocating said carriage toward and away from said bale chamber, said track comprising a pair of laterally spaced, parallel track members, said carriage comprising a rectangular framework having a pair of shafts extending parallel to each other and to the extension of said bale chamber, one of said shafts being located at the end of the carriage toward said bale chamber and the other shaft being located at the end of the carriage remote from the bale chamber, said shafts having ends projecting beyond the carriage framework and each shaft end having mounted thereon a bearing member engaging said track, there being four bearing members in all, one at each corner of the framework, and feed fingers depending from said shafts and engageable with hay on said platform.

2. A hay baler as recited in claim 1 wherein said carriage is reciprocated by means of an oscillatable endless chain having one reach connected to said carriage, said one reach being disposed in a vertical plane between said track members.

3. A hay baler as recited in claim 2 wherein each shaft carries two feed fingers, one on each side of the vertical plane of said one reach of said endless chain, means being provided for supporting the fingers on the shaft for pivotal movement.

4. A hay baler as recited in claim 2 wherein said one reach is connected to said carriage by means comprising a plate through which said reach extends, a block on one side of said plate, shear means connecting said block to said plate, said shear means when broken permitting movement of said one reach relative to said carriage in one direction, said block engaging said plate when the one reach moves in an opposite direction.

5. A hay baler comprising a generally horizontally extending bale chamber having a feed opening in a side wall thereof, a plunger reciprocable in said bale chamber and past said opening, a platform extending laterally from said one side wall and feed opening, and yieldable feed means operable above said platform for conveying hay across the patform, through said opening and into said bale chamber, said feed means comprising a generally horizontal track mounted above said platform, a carriage mounted on said track for rectilinear movement thereover toward and away from said bale chamber, a feed finger depending from said carriage and engageable with crop material on said platform, an endless chain having a reach extending parallel to said track and in a given plane, means including a sprocket for oscillating said endless chain in timed relation with said plunger, means connecting said one reach to said carriage, a clock spring interposed between said sprocket of said oscillating means and said carriage, and means mounting said clock spring for yieldable movement in a location close to said given plane of said reach.

References Cited in the file of this patent

UNITED STATES PATENTS

| | | |
|---|---|---|
| 1,904,530 | Rathbun | Apr. 18, 1933 |
| 2,572,180 | Morrison | Oct. 23, 1951 |
| 2,757,602 | Nolt | Aug. 7, 1956 |
| 2,862,347 | Nelson | Dec. 2, 1958 |
| 2,884,850 | Nolt | May 5, 1959 |
| 2,948,101 | Long | Aug. 9, 1960 |

FOREIGN PATENTS

| | | |
|---|---|---|
| 773,479 | Great Britain | Apr. 24, 1957 |